US007784462B2

(12) United States Patent
Vogt et al.

(10) Patent No.: US 7,784,462 B2
(45) Date of Patent: Aug. 31, 2010

(54) OXYGEN SUPPLY AND DISTRIBUTION SYSTEM FOR A PASSENGER AIRCRAFT

(75) Inventors: Thomas Vogt, Hamburg (DE); Walter Deutscher, Dassendorf (DE); Hans-Juergen Heinrich, Hamburg (DE)

(73) Assignee: Airbus Deutschland GmbH, Hamburg (DE)

( * ) Notice: Subject to any disclaimer, the term of this patent is extended or adjusted under 35 U.S.C. 154(b) by 1635 days.

(21) Appl. No.: 10/934,772

(22) Filed: Sep. 3, 2004

(65) Prior Publication Data

US 2005/0061915 A1 Mar. 24, 2005

(30) Foreign Application Priority Data

Sep. 5, 2003 (DE) ............................... 103 40 985

(51) Int. Cl.
*A61G 10/00* (2006.01)
*A62B 18/02* (2006.01)
*A62B 18/00* (2006.01)
*A62B 18/10* (2006.01)
*A62B 17/00* (2006.01)
*A62B 9/04* (2006.01)
*A62B 7/00* (2006.01)
*F16K 31/26* (2006.01)

(52) U.S. Cl. ............................. 128/204.29; 128/202.11; 128/202.27; 128/204.18; 128/204.21; 128/204.22; 128/201.28; 128/201.23; 128/205.25; 128/205.26

(58) Field of Classification Search ............ 128/202.11, 128/202.27, 204.18, 204.21, 204.22, 204.29, 128/201.28, 201.23, 205.25, 205.26
See application file for complete search history.

(56) References Cited

U.S. PATENT DOCUMENTS

| 3,045,691 | A |   | 7/1962 | Young |              |
|-----------|---|---|--------|----------------|--------------|
| 4,651,728 | A | * | 3/1987 | Gupta et al.   | 128/201.28   |
| 5,169,415 | A |   | 12/1992| Roettger et al.|              |
| 5,199,423 | A |   | 4/1993 | Harral et al.  |              |
| 5,809,999 | A |   | 9/1998 | Lang           |              |
| 6,290,759 | B1| * | 9/2001 | Fenner et al.  | 96/130       |
| 6,846,347 | B2| * | 1/2005 | Phillips et al.| 95/8         |

FOREIGN PATENT DOCUMENTS

| DE | 41 04 007  | 8/1991  |
| DE | 297 17 065 | 1/1998  |
| EP | 0391607    | 10/1990 |
| FR | 1 214 998  | 4/1960  |
| GB | 828 362    | 2/1960  |
| GB | 854 021    | 11/1960 |

* cited by examiner

*Primary Examiner*—Loan H Thanh
*Assistant Examiner*—Nihir Patel
(74) *Attorney, Agent, or Firm*—W. F. Fasse; W. G. Fasse (57) ABSTRACT

Aircraft passengers who require a therapeutic oxygen supply independently of the prevailing cabin pressure, as distinguished from an emergency oxygen supply that depends on an inadequate cabin pressure, can breath therapeutic oxygen and/or emergency oxygen depending on the situation, through the same therapeutic oxygen masks. For this purpose a control accessible to the crew is used to connect a therapeutic oxygen supply to the emergency oxygen distribution system of the aircraft, whereby the source of oxygen is used either partially for therapeutic purposes or fully for emergency purposes.

28 Claims, 5 Drawing Sheets

OXYGEN SUPPLY AND DISTRIBUTION SYSTEM FOR A PASSENGER AIRCRAFT

PRIORITY CLAIM

This application is based on and claims the priority under 35 U.S.C. §119 of German Patent Application 103 40 985.8, filed on Sep. 5, 2003, the entire disclosure of which is incorporated herein by reference.

FIELD OF THE INVENTION

The invention relates to the supply and distribution of therapeutic oxygen to the passengers of an aircraft which is equipped with an emergency oxygen system that becomes operational in response to a drop of cabin pressure below a predetermined level.

BACKGROUND INFORMATION

Certain passengers must breathe additional oxygen at any time or at all times during a flight independently of the current operational status of the emergency oxygen supply system. This requirement for additional oxygen occurs particularly when the cabin pressure is lower than the normal atmospheric pressure at sea level, but not low enough to trigger the operation of the emergency oxygen supply. Such persons may require additional oxygen during the entire flight time and during times while sitting in the aircraft on the ground. For this purpose it is customary to use chemical oxygen generators, portable oxygen bottles or tanks, or portable oxygen generators known as OBOGS (on board oxygen generator system). These additional oxygen sources and their respective distribution systems are not permanently installed in an aircraft and require installation and maintenance when an aircraft is prepared for its next flight.

This disclosure distinguishes between an emergency oxygen supply and a therapeutic oxygen supply made available for passengers who require extra oxygen.

Certain types of aircraft have a permanently installed therapeutic oxygen supply system including a therapeutic oxygen source installed at a certain location within the aircraft. The distribution of therapeutic oxygen is performed through a separate conduit system connected to oxygen taps in the aircraft cabin. These oxygen taps are constructed for connecting therapeutic oxygen breathing masks to the taps for passengers who require such a therapeutic oxygen supply service.

It is also conventional to have small portable oxygen supply bottles on board for those passengers that only have a temporary breathing problem for which they require additional oxygen.

There are basically four conventional approaches for the supply of therapeutic oxygen to aircraft passengers. Chemical oxygen generators for supplying therapeutic oxygen to passengers require repeated installation, removal, and maintenance work including safety checks. Such chemical oxygen generators must be triggered either manually or automatically. Further, systems with chemical oxygen generators require the installation of more or fewer generators, depending on the flight duration and on the estimated number of passengers that may want to use therapeutic oxygen. Once chemical oxygen generators have been activated it is not possible to deactivate such generators, whereby the produced oxygen that is not used for the therapeutic services, is wasted. If a decompression of the cabin pressure occurs, in response to which the emergency oxygen system is activated, the user of the therapeutic oxygen supply system must exchange the therapeutic oxygen breathing mask against an emergency oxygen breathing mask. The passengers need to be instructed accordingly and in an emergency, confusion may result as to which mask is which.

Similar considerations apply to the use of portable oxygen bottles for the supply of therapeutic oxygen. Such bottles have their own masks which must be exchanged against the emergency oxygen breathing mask when the cabin pressure drops below the predetermined level. Additionally, portable oxygen supply bottles need a control that is responsive to the current cabin pressure. Such control must be explained to the user which also may result in confusion. The foregoing considerations also apply to portable oxygen generators (OBOGS). Here again a switch between different oxygen breathing masks is required when the emergency oxygen system becomes effective.

Similar considerations apply to a permanently installed therapeutic oxygen supply system which also has its own separate oxygen masks that must be exchanged for emergency oxygen masks when the emergency oxygen supply system becomes effective in response to a failed cabin pressure.

OBJECTS OF THE INVENTION

In view of the foregoing it is the aim of the invention to achieve the following objects singly or in combination:

to construct an oxygen supply system for a passenger aircraft in such a way, that the same oxygen breathing masks can be used for a continuously available therapeutic oxygen supply or for an emergency oxygen supply;

to use at least a portion of the emergency oxygen distribution conduit system also for the distribution of therapeutic oxygen;

to minimize the effort and expense for the installation and maintenance of the entire oxygen supply and distribution system and particularly the therapeutic oxygen supply and distribution system of a passenger aircraft; and to make the use of the emergency oxygen supply and the use of the therapeutic oxygen supply as simple as possible for the passengers to avoid confusions.

The invention further aims at avoiding or overcoming the disadvantages of the prior art, and to achieve additional advantages, as apparent from the present specification. The attainment of these objects is, however, not a required limitation of the present invention.

SUMMARY OF THE INVENTION

The above objects have been achieved according to the invention by the combination of the following features in an oxygen supply system for a passenger aircraft, which system comprises oxygen breathing masks (OM) accessible to passengers for use at any time for therapeutic purposes or for emergency purposes. The oxygen supply source thus has a capacity sufficient for both purposes and can be activated partially for therapeutic purposes and fully for emergency purposes. The oxygen source includes an emergency oxygen supply subsystem (EOS) with a first oxygen source (1) and a therapeutic oxygen supply subsystem (TOS) with a second oxygen source (1', 22), a first oxygen conduit (EOC) connecting said first oxygen source (1) to said oxygen breathing masks (OM), a second oxygen conduit (TOC) connecting said second oxygen source (1', 22) to said oxygen breathing masks (OM), controllable valve means in at least one of said first and second oxygen conduits (EOC, TOC) for selectively connecting said oxygen breathing masks to one of said first subsystem (EOS) or to said second subsystem (TOS), and a control (16, 26) connected to said subsystems (EOS and TOS) for activating either the first or the second or both subsystems, whereby the same oxygen breathing masks (OM) are selectively usable for therapeutic or for emergency purposes.

The main advantage of the invention is seen in that duplications of oxygen supply components such as masks, conduits in the form of pipes and/or hoses, as well as valves are substantially reduced. Another advantage of the invention is seen in that a supply of therapeutic oxygen is available to any passenger at all times when that passenger is onboard and that an emergency oxygen supply is available to all passengers when the cabin pressure falls below a predetermined level, whereby the passengers receiving therapeutic oxygen can use the same masks in both instances. Still another advantage of the present system is seen in that a sufficient oxygen supply for therapeutic purposes and for emergency purposes is available on board of the passenger aircraft at all times, yet the weight and costs are reduced because certain components such as conduits, valves and particularly the oxygen breathing masks are used for both emergency and therapeutic purposes.

BRIEF DESCRIPTION OF THE DRAWINGS

In order that the invention may be clearly understood, it will now be described in connection with example embodiments thereof, with reference to the accompanying drawings, wherein.

DETAILED DESCRIPTION OF A PREFERRED EXAMPLE EMBODIMENT AND OF THE BEST MODE OF THE INVENTION

Figure 1:
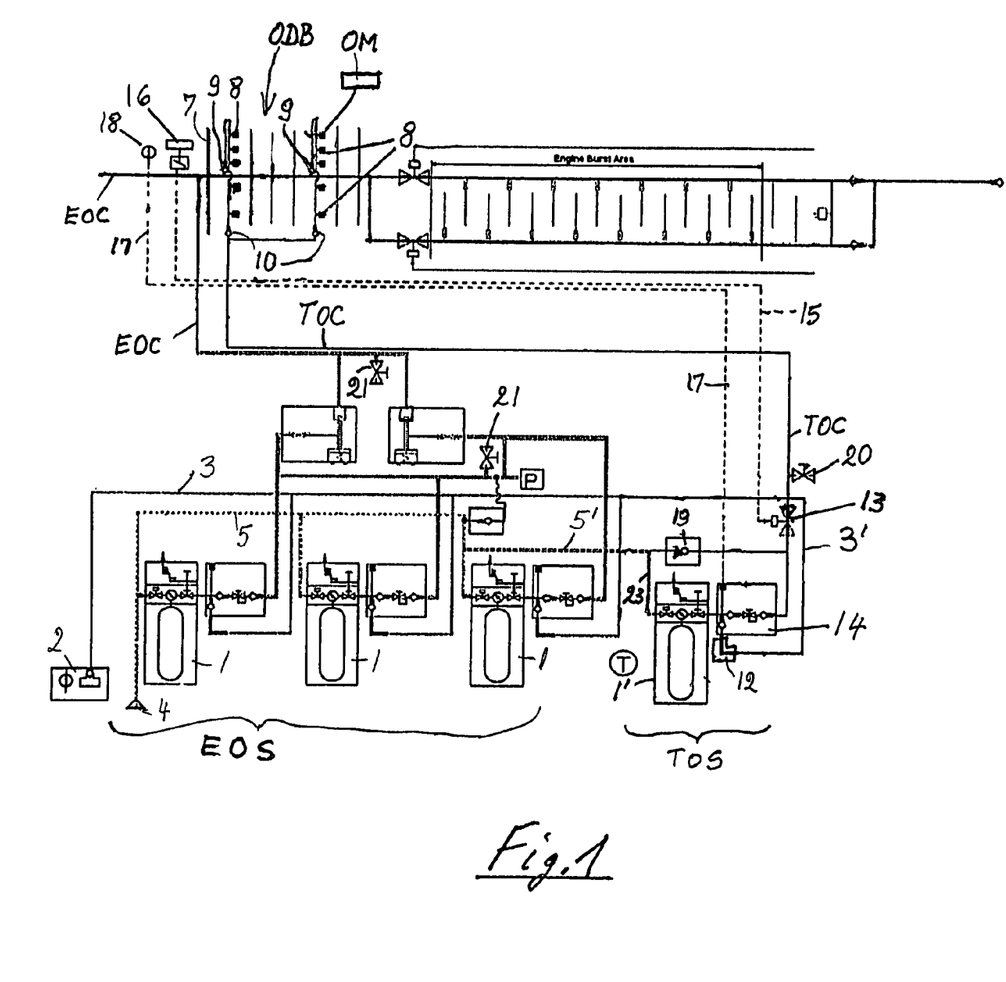
FIG. 1 shows a first embodiment with bottles or tanks forming an emergency oxygen supply while an additional bottle of the same construction forms a therapeutic oxygen supply with both supplies connectable to the same therapeutic oxygen masks.
Figure 2:
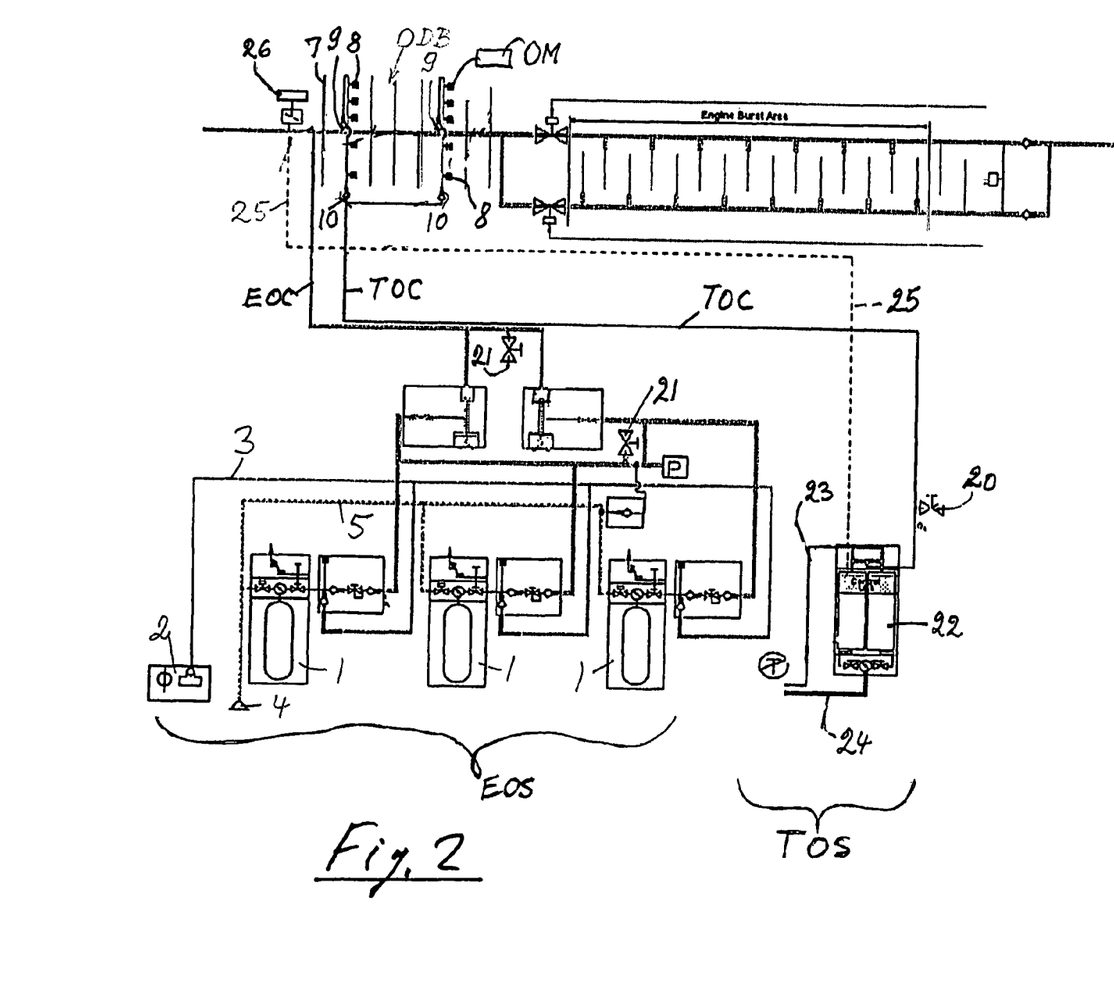
FIG. 2 shows a second embodiment in which the therapeutic oxygen supply is an onboard oxygen generator with both supplies connectable to the same masks as in FIG. 1.
Figure 4:
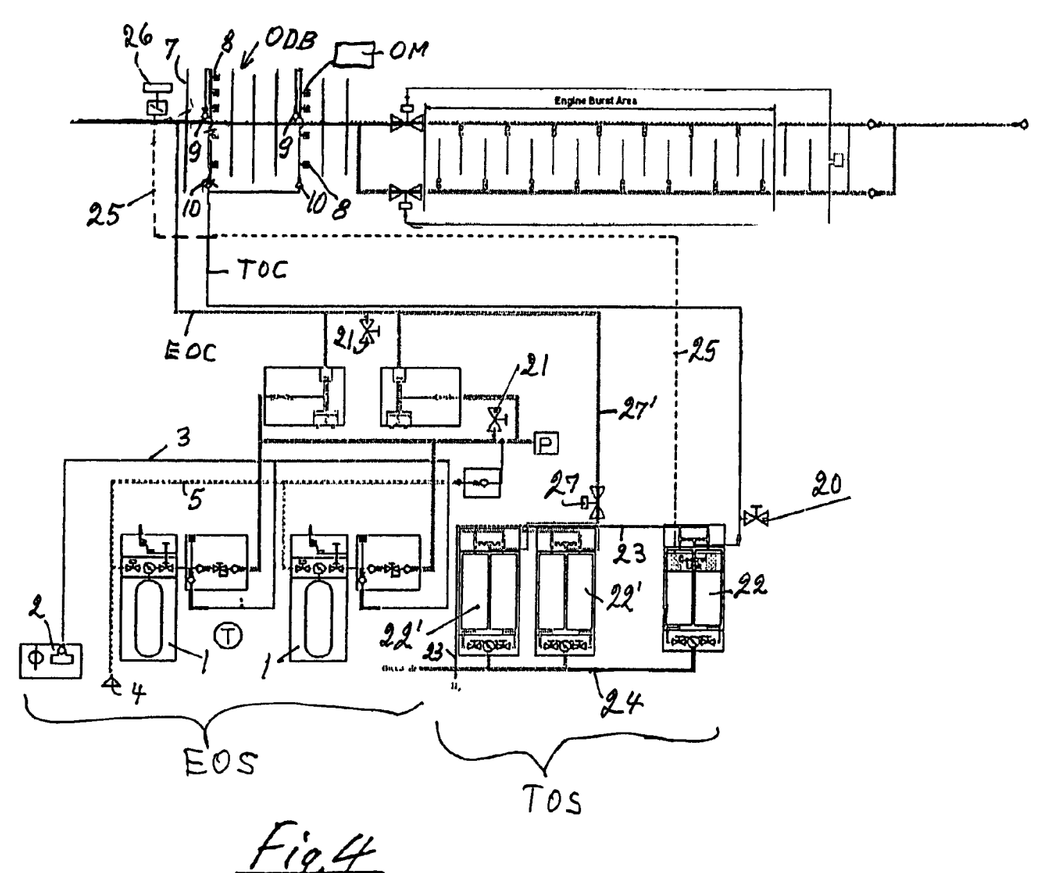
FIG. 4 shows a further embodiment in which the therapeutic oxygen supply system comprises an onboard battery of oxygen generators with the oxygen distribution as in FIGS. 1 and 2, and wherein the battery of oxygen generators may be used to supplement the oxygen supply for the emergency system.

Features that are the same in more than one FIG. will be described first and only once. FIGS. 1, 2 and 4 show an emergency oxygen supply subsystem EOS and a therapeutic oxygen supply subsystem TOS. The emergency subsystem EOS comprises three oxygen bottles 1 connected to a common filling port 2 by a filling conduit or pipeline 3. The emergency oxygen subsystem EOS comprises control means such as valves, pressure reducers and heat exchangers. The subsystem is connected in common through an emergency oxygen conduit EOC to at least one, preferably several oxygen distribution banks ODB to be described in more detail below.

All oxygen bottles or tanks 1 are of the same construction and are connected in common to a discharge port 4 by a conduit or pipe line 5. All oxygen distribution banks ODB are of identical construction and serve for an oxygen distribution from both supply subsystems EOS and TOS. Each oxygen distribution bank ODB comprises a conduit such as a pipeline, hose or the like 7 provided with a plurality of oxygen outlets 8 to which oxygen masks OM are connectable, for example by quick coupling plug-in connectors or the like. According to the invention the same therapeutic oxygen masks OM also of identical construction are used in an emergency situation when the cabin pressure falls below a determined level or when a passenger requires a therapeutic oxygen supply. For this dual purpose each oxygen distribution bank ODB in FIGS. 1, 2 and 4 is connected at one end through a respective check valve 9 to an emergency oxygen supply conduit EOC leading to the emergency supply EOS. The other end of each oxygen distribution bank ODB is connected through a respective further check valve 10 to a therapeutic oxygen supply conduit TOC leading to the therapeutic oxygen supply subsystem TOS.

Figure 3:
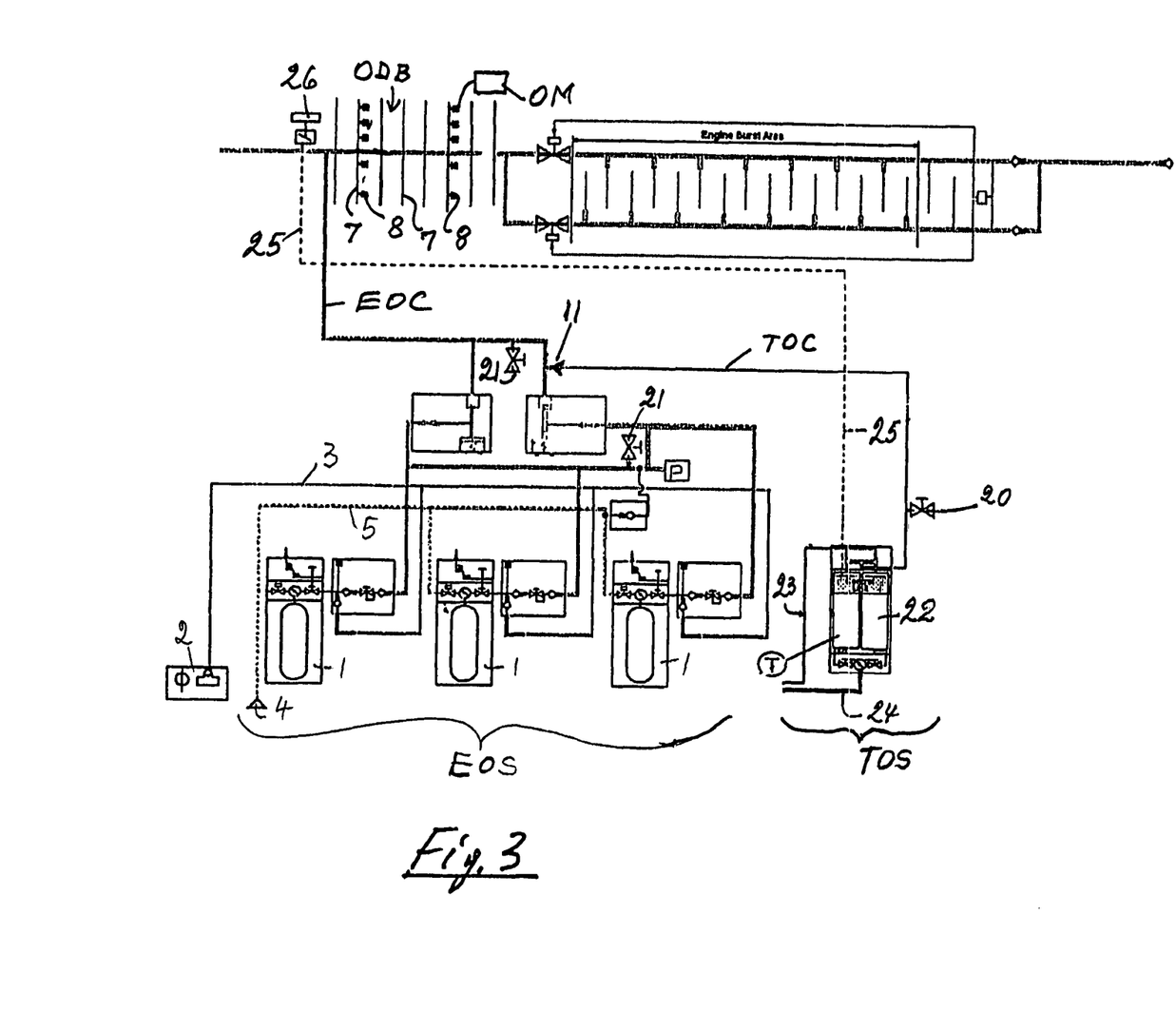
FIG. 3 shows the same oxygen supply system as in FIG. 2, with a modified oxygen distribution wherein the oxygen masks are connected to an emergency oxygen conduit which in turn is connected through a valve to a therapeutic oxygen conduit.
Figure 5:
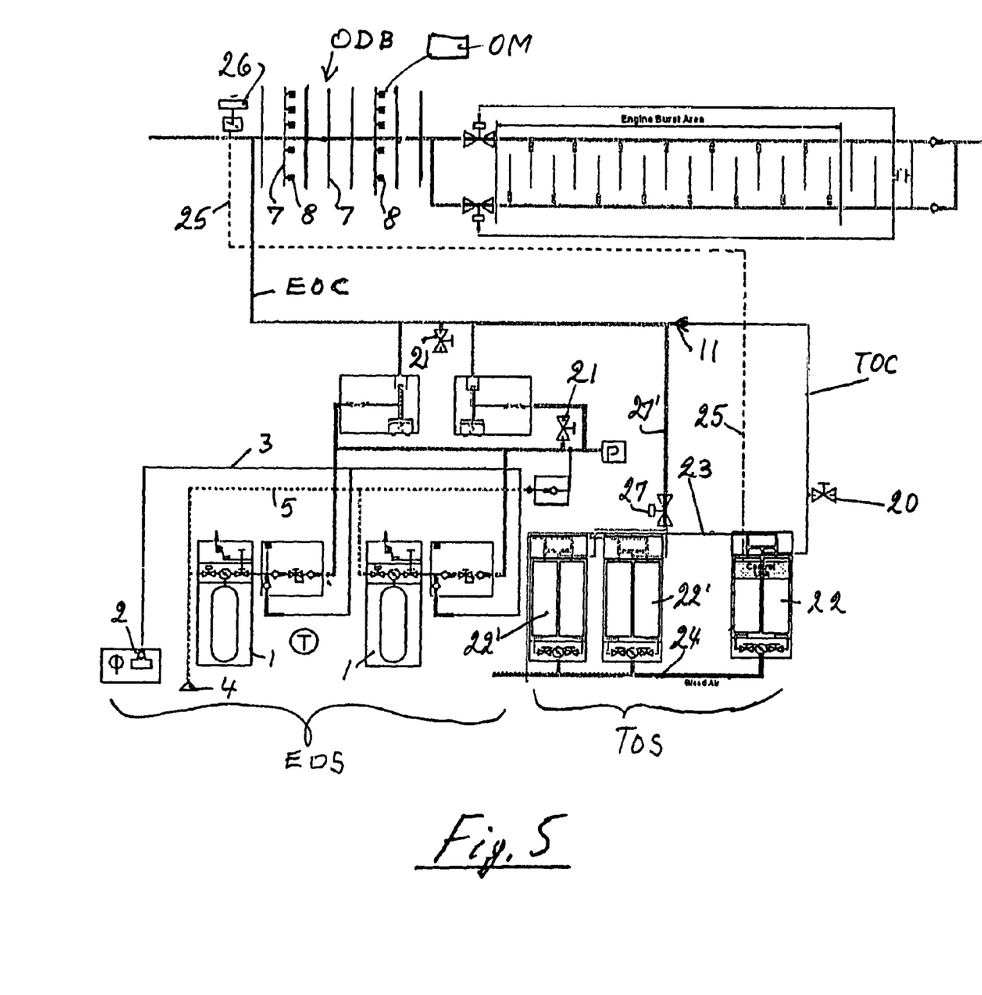
FIG. 5 illustrates an embodiment in which the oxygen supply is the same as in FIG. 4 with an oxygen distribution as in FIG. 3.

The oxygen distribution banks ODB in FIGS. 3 and 5 are of identical construction with a conduit 7 and oxygen outlets 8. The check valves 9 and 10 are omitted in FIGS. 3 and 5. Instead, all oxygen distribution banks ODB are directly connected in common to the emergency oxygen supply conduit EOC. The conduit EOC is connected to the supply EOS as in FIGS. 1, 2 and 4 and additionally through a single check valve 11 to the therapeutic oxygen supply conduit TOC leading to the therapeutic oxygen supply subsystem TOS.

The therapeutic oxygen supply subsystem TOS in FIG. 1 comprises one or more additional oxygen bottles 1' of the same construction as the bottles 1' of the emergency oxygen supply subsystem EOS. The additional bottle 1' is also connected to the discharge line 5 through an extension discharge line 5' connected to the line 5. Similarly, the therapeutic oxygen supply bottle 1' is connected through a pipeline extension 3' of the pipeline 3 to the filling port 2. Thus, all four oxygen supply bottles 1 and 1' can be filled simultaneously when the aircraft is in maintenance. The filling line extension 3' is connected to the supply bottle 1' through a heat compensator or heat exchanger 12 for keeping the temperature of the supply systems TOS and EOS at an acceptable limit during rapid filling of the bottles 1 and 1'. The therapeutic oxygen supply conduit TOC is connected through a controllable shut-off valve 13 and through a pressure controller, particularly a pressure reducer 14 to the therapeutic oxygen supply bottle 1'. A control connection 15 such as an electrical conductor, a pneumatic or hydraulic line or the like connects the controllable shut-off valve 13 to a control member such as a switch 16. The valve 13 can thus be opened or closed by a crew member as needed by an electrical, a pneumatic, or a mechanical, or any other suitable control. A pressure conduit 17 connects the pressure reducer 14 to a pressure indicator 18. The pressure indicator 18 tells the crew the pressure in the therapeutic oxygen supply bottle 1', thereby enabling the crew to determine the quantity of oxygen still remaining in the supply bottle 1'.

A safety valve 19 interconnects the discharge pipeline extension 5' with the therapeutic oxygen conduit TOC to relieve any excess pressure in the therapeutic oxygen supply subsystem TOS through the conduit 5 and out the discharge port 4.

In operation, the therapeutic oxygen supply subsystem TOS will be switched on by opening the valve 13 so that any passenger can receive therapeutic oxygen through any of the masks OM. In an emergency, when the cabin pressure falls below a predetermined mandatory level, the valve 10 will be closed and the valve 9 will be opened automatically in response to the pressure drop and the emergency oxygen supply subsystem EOS will be switched on. Thus, a passenger or any passenger can receive oxygen either from the therapeutic oxygen supply TOS at all times onboard when the cabin pressure is normal or from the emergency oxygen supply EOS when the cabin pressure is below normal but always through the same mask OM. The important advantage of the embodiment of FIG. 1 is seen in that all oxygen supply bottles 1 and 1' can be filled simultaneously and that the oxygen distribution banks ODB and the masks OM can be used by both supply systems EOS and TOS by an appropriate control of the valves 9, 10 and 13.

Each of the five embodiments shown in FIGS. 1 to 5 comprises a test port closeable by a shut-off valve 20 for checking whether the therapeutic oxygen supply subsystem TOS and its conduit TOC are properly sealed so that there are no leaks. Further components 21 perform the same function in each of the five embodiments for the emergency oxygen supply EOS and its conduit EOC.

In FIGS. 2 and 3 the therapeutic oxygen supply subsystem TOS is the same in the form of an oxygen generator 22 connected to the oxygen distribution banks ODB through the therapeutic oxygen conduit TOC. The oxygen generator 22 is connected to a gas venting conduit 23 for bleeding nitrogen $N_2$ from the top of the oxygen generator 22 which is also connected to a bleed air pipeline 24 at its bottom. A control line 25 connects the oxygen generator 22 to a control panel with a switch 26 that may be operated as described above with any suitable command transmission through the control line 25.

In FIGS. 4 and 5 the oxygen generator 22 is reinforced by additional oxygen generators 22' connected in parallel with the oxygen generator 22 to form a battery of such oxygen generators. The battery of oxygen generators is connected in common at the top of the generators to the gas vent line 23 while the bottom of the battery is connected to the bleed line 24 just as in the FIGS. 2 and 3 with the single oxygen generator.

In FIGS. 4 and 5 a shut-off valve 27 and a conduit 27' connected to the conduit EOC permit using oxygen generated by the generator battery 22, 22' in the emergency oxygen supply system, if needed. Again, the same therapeutic oxygen distribution banks ODB and the same oxygen breathing masks OM will be used.

Incidentally, the determination of a sufficient oxygen supply for emergency and therapeutic purposes will depend on the type of passenger aircraft, on the flight duration, and on a safety margin that is determined on past experience.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. An oxygen supply system for a passenger aircraft, said system comprising at least one therapeutic oxygen breathing mask (OM) accessible to passengers, an emergency oxygen supply first subsystem (EOS) including a first oxygen source (1), a therapeutic oxygen supply second subsystem (TOS) including a second oxygen source (1', 22), a first oxygen conduit (EOC) connecting said first oxygen source (1) to said at least one therapeutic oxygen breathing mask (OM), a second oxygen conduit (TOC) connecting said second oxygen source (1', 22) to said at least one therapeutic oxygen breathing mask (OM), controllable valve means in at least one of said first and second oxygen conduits (EOC, TOC) for connecting said at least one therapeutic oxygen breathing mask selectively to one of said first subsystem (EOS) and said second subsystem (TOS), a control (16, 26) connected to said second subsystem (TOS) for activating said second subsystem (TOS), whereby said at least one therapeutic oxygen breathing mask is selectively usable in said first subsystem and in said second subsystem, wherein said controllable valve means comprises pressure responsive valves (9, 10) for switching between said first subsystem (EOS) and said second subsystem (TOS) so that oxygen is supplied to said at least one therapeutic oxygen breathing mask (OM) from said first oxygen source (1) when a cabin pressure in said passenger aircraft falls below a predetermined cabin pressure threshold value, and so that oxygen is supplied to said at least one therapeutic oxygen breathing mask (OM) from said second oxygen source (1', 22) when said cabin pressure rises above said predetermined cabin pressure threshold value.

2. The system of claim 1, further comprising at least one oxygen distribution bank (ODB), and oxygen outlets (8) connected to said at least one oxygen distribution bank (ODB), wherein said at least one therapeutic oxygen breathing mask is connectable to a respective at least one of said oxygen outlets (8), and wherein said pressure responsive valves include a first pressure responsive valve (9) connecting said first oxygen conduit (EOC) to one end of said at least one oxygen distribution bank (ODB) and to said first subsystem (EOS), and a second pressure responsive valve (10) connecting said second oxygen conduit (TOC) to an opposite end of said at least one oxygen distribution bank (DB) and to said second subsystem (TOS).

3. The system of claim 1, wherein said second oxygen source of said second subsystem (TOS) comprises a portable oxygen generator (22) connected to said second oxygen conduit (TOC) for providing a therapeutic oxygen supply to said at least one therapeutic oxygen breathing mask.

4. The system of claim 3, wherein said portable oxygen generator (22) comprises a plurality of generators (22') connected in parallel to each other to form an oxygen generator battery.

5. The system of claim 1, further comprising a vent (23) connected to said second subsystem (TOS).

6. The system of claim 1, wherein said second oxygen source comprises a battery of oxygen generators (22, 22'), and further comprising a conduit (27') with a shut-off valve (27) interposed between and selectively connecting at least one of said oxygen generators of said second subsystem to said first subsystem.

7. The system of claim 1, further comprising a pressure control member (14) interposed between and connecting said second oxygen source (1') to said second oxygen conduit (TOC) for supplying therapeutic oxygen with a constant operating pressure into said second oxygen conduit (TOC), wherein said pressure control member (14) is a pressure reducer.

8. The system of claim 1, further comprising a pressure indicator (18) operatively connected to said second oxygen source (1') of said second subsystem.

9. The system of claim 1, further comprising an excess pressure control valve (19) operatively connected to said second subsystem (TOS) for releasing excess pressure from said second subsystem (TOS).

10. An oxygen supply system for a passenger aircraft, said system comprising at least one therapeutic oxygen breathing mask (OM) accessible to passengers, an emergency oxygen supply first subsystem (EOS) including a first oxygen source (1), a therapeutic oxygen supply second subsystem (TOS) including a second oxygen source (1', 22), a first oxygen conduit (EOC) connecting said first oxygen source (1) to said at least one therapeutic oxygen breathing mask (OM), a second oxygen conduit (TOC) connecting said second oxygen source (1', 22) to said at least one therapeutic oxygen breathing mask (OM), controllable valve means in at least one of said first and second oxygen conduits (EOC, TOC) for connecting said at least one therapeutic oxygen breathing mask selectively to one of said first subsystem (EOS) and said second subsystem (TOS), a control (16, 26) connected to said second subsystem (TOS) for activating said second subsystem (TOS), and a pressure control member (14) interposed between and connecting said second oxygen source (1') to said second oxygen conduit (TOC) for supplying therapeutic oxygen with a constant operating pressure into said second oxygen conduit (TOC), whereby said at least one therapeutic oxygen breathing mask is selectively usable in said first subsystem and in said second subsystem, wherein said second oxygen source comprises an oxygen bottle or tank connected to said second oxygen conduit (TOC) for providing a therapeutic oxygen supply, and wherein said controllable valve means is a shut-off valve (13) positioned in said second oxygen conduit (TOC), said shut-off valve (13) being operatively connected to said control (16) for selectively opening and closing said second oxygen conduit (TOC) through said control (16).

11. An oxygen supply system for a passenger aircraft, said system comprising at least one therapeutic oxygen breathing mask (OM) accessible to passengers, an emergency oxygen supply first subsystem (EOS) including a first oxygen source (1), a therapeutic oxygen supply second subsystem (TOS) including a second oxygen source (1', 22), a first oxygen conduit (EOC) connecting said first oxygen source (1) to said at least one therapeutic oxygen breathing mask (OM), a second oxygen conduit (TOC) connecting said second oxygen source (1', 22) to said at least one oxygen breathing mask (OM), controllable valve means in at least one of said first and second oxygen conduits (EOC, TOC) for selectively connecting said at least one therapeutic oxygen breathing mask to one of said first subsystem (EOS) and said second subsystem (TOS), and a control (16, 26) connected to said second subsystem (TOS) for activating said second subsystem (TOS), whereby said at least one therapeutic oxygen breathing mask is selectively usable in said first subsystem and in said second subsystem, wherein said first oxygen source (1) and said second oxygen source (1') comprise oxygen tanks or bottles (1, 1'), and further comprising a common filling line (3, 3') connected to said oxygen tanks or bottles, and a common filling port (2) connected to said common filling line (3, 3').

12. An oxygen supply system for a passenger aircraft, said system comprising at least one therapeutic oxygen breathing mask (OM) accessible to passengers, an emergency oxygen supply first subsystem (EOS) including a first oxygen source (1), a therapeutic oxygen supply second subsystem (TOS) including a second oxygen source (1', 22), a first oxygen conduit (EOC) connecting said first oxygen source (1) to said at least one therapeutic oxygen breathing mask (OM), a second oxygen conduit (TOC) connecting said second oxygen source (1', 22) to said at least one therapeutic oxygen breathing mask (OM), controllable valve means in at least one of said first and second oxygen conduits (EOC, TOC) for selectively connecting said at least one therapeutic oxygen breathing mask to one of said first subsystem (EOS) and said second subsystem (TOS), a control (16, 26) connected to said second subsystem (TOS) for activating said second subsystem (TOS), a pressure control member (14) connecting said second oxygen source (1') to said second oxygen conduit (TOC) for supplying therapeutic oxygen with a constant operating pressure into said second oxygen conduit (TOC), whereby said at least one therapeutic oxygen breathing mask is selectively usable in said first subsystem and in said second subsystem, a vent (23) connected to said second subsystem (TOS), and a vent line (5, 5') connecting said vent (23) to said first subsystem (EOS) and to said second subsystem (TOS), said vent line leading outside of said passenger aircraft for venting both said first and second subsystems in common through said vent line.

13. An oxygen supply system for a passenger aircraft, said system comprising at least one therapeutic oxygen breathing mask (OM) accessible to passengers, an emergency oxygen supply first subsystem (EOS) including a first oxygen source (1), a therapeutic oxygen supply second subsystem (TOS) including a second oxygen source (1', 22), a first oxygen conduit (EOC) connecting said first oxygen source (1) to said at least one therapeutic oxygen breathing mask (OM), a second oxygen conduit (TOC) connecting said second oxygen source (1', 22) to said at least one therapeutic oxygen breathing mask (OM), controllable valve means in at least one of said first and second oxygen conduits (EOC, TOC) for selectively connecting said at least one therapeutic oxygen breathing mask to one of said first subsystem (EOS) and said second subsystem (TOS), a control (16, 26) connected to said second subsystem (TOS) for activating said second subsystem (TOS), a pressure control member (14) connecting said second oxygen source (1') to said second oxygen conduit (TOC) for supplying therapeutic oxygen with a constant operating pressure into said second oxygen conduit (TOC), whereby said at least one therapeutic oxygen breathing mask is selectively usable in said first subsystem and in said second subsystem, a vent (23) connected to said second subsystem (TOS), and an air bleed line (24), and wherein said vent (23) is connected to said air bleed line (24).

14. An oxygen supply system for a passenger aircraft, said system comprising at least one therapeutic oxygen breathing mask (OM) accessible to passengers, an emergency oxygen supply first subsystem (EOS) including a first oxygen source (1), a therapeutic oxygen supply second subsystem (TOS) including a second oxygen source (1', 22), a first oxygen conduit (EOC) connecting said first oxygen source (1) to said at least one therapeutic oxygen breathing mask (OM), a second oxygen conduit (TOC) connecting said second oxygen source (1', 22) to said at least one therapeutic oxygen breathing mask (OM), controllable valve means in at least one of said first and second oxygen conduits (EOC, TOC) for selectively connecting said at least one therapeutic oxygen breathing mask to one of said first subsystem (EOS) and said second subsystem (TOS), a control (16, 26) connected to said second subsystem (TOS) for activating said second subsystem (TOS), a pressure control member (14) connecting said second oxygen source (1') to said second oxygen conduit (TOC) for supplying therapeutic oxygen with a constant operating pressure into said second oxygen conduit (TOC), whereby said at least one therapeutic oxygen breathing mask is selectively usable in said first subsystem and in said second subsystem, and a heat compensator (12) or heat exchanger operatively arranged for cooperation with said pressure control member which is a pressure reducer for maintaining the temperature of said second oxygen source in a safe range when filling said second oxygen source.

15. An oxygen supply system for a passenger aircraft, said system comprising at least one therapeutic oxygen breathing mask (OM) accessible to passengers, an emergency oxygen supply first subsystem (EOS) including a first oxygen source (1), a therapeutic oxygen supply second subsystem (TOS) including a second oxygen source (1', 22), a first oxygen conduit (EOC) connecting said first oxygen source (1) to said at least one therapeutic oxygen breathing mask (OM), a second oxygen conduit (TOC) connecting said second oxygen source (1', 22) to said at least one therapeutic oxygen breathing mask (OM), controllable valve means in at least one of said first and second oxygen conduits (EOC, TOC) for selectively connecting said at least one therapeutic oxygen breathing mask to one of said first subsystem (EOS) and said second subsystem (TOS), a control (16, 26) connected to said second subsystem (TOS) for activating said second subsystem (TOS), a pressure control member (14) connecting said second oxygen source (1') to said second oxygen conduit (TOC) for supplying therapeutic oxygen with a constant operating pressure into said second oxygen conduit (TOC), whereby said at least one therapeutic oxygen breathing mask is selectively usable in said first subsystem and in said second subsystem, and a closeable test outlet (20) operatively connected to said second subsystem (TOS) for testing said second subsystem for leaks.

16. An oxygen supply system for a passenger aircraft, said system comprising at least one therapeutic oxygen breathing mask (OM) accessible to passengers, an emergency oxygen supply first subsystem (EOS) including a first oxygen source (1), a therapeutic oxygen supply second subsystem (TOS) including a second oxygen source (1', 22), a first oxygen conduit (EOC) connecting said first oxygen source (1) to said at least one therapeutic oxygen breathing mask (OM), a second oxygen conduit (TOC) connecting said second oxygen source (1', 22) to said at least one therapeutic oxygen breathing mask (OM), controllable valve means in at least one of said first and second oxygen conduits (EOC, TOC) for selectively connecting said at least one therapeutic oxygen breathing mask to one of said first subsystem (EOS) and said second subsystem (TOS), a control (16, 26) connected to said second subsystem (TOS) for activating said second subsystem (TOS), whereby said at least one therapeutic oxygen breathing mask is selectively usable in said first subsystem and in said second subsystem, wherein said second oxygen source comprises a battery of oxygen generators (22, 22'), and further comprising a conduit (27') with a shut-off valve (27) selectively connecting at least one of said oxygen generators of said second subsystem to said first subsystem, a common gas vent line (23) connected in common to said oxygen generators, and a common air bleed line (24) connected in common to said oxygen generators.

17. The system of claim 16, further comprising at least one oxygen distribution bank (ODB), and oxygen outlets (8) connected to said at least one oxygen distribution bank (ODB), wherein said at least one therapeutic oxygen breathing mask (OM) is connectable to a respective at least one of said oxygen outlets (8), said first oxygen conduit (EOC) connects said first subsystem (EOS) to said at least one oxygen distribution bank (ODB), said second oxygen conduit (TOC) connects said second subsystem (TOS) to said first oxygen conduit (EOC), and said controllable valve means further comprise a pressure controllable valve (11) between said first oxygen conduit (EOC) and said second oxygen conduit (TOC).

18. An oxygen supply system for a passenger aircraft, said system comprising at least one therapeutic oxygen breathing mask (OM) accessible to passengers, an oxygen supply system (EOS) including a supplemental oxygen supply source sufficient for emergency oxygen supply purposes when a cabin pressure falls below a predetermined cabin pressure threshold value and for therapeutic oxygen supply purposes when a cabin pressure is in a normal range above said predetermined cabin pressure threshold value, a first oxygen conduit (EOC) connecting said supplemental oxygen supply source to said at least one therapeutic oxygen breathing mask (OM), a second oxygen conduit (TOC) connecting said supplemental oxygen supply source to said at least one therapeutic oxygen breathing mask (OM), a valve arrangement including at least one pressure responsive valve arranged in at least one of said first and second oxygen conduits (EOC, TOC) and adapted to pressure-responsively connect said at least one therapeutic oxygen breathing mask to said supplemental oxygen supply source selectively through said first oxygen conduit (EOC) when said cabin pressure in said passenger aircraft is below said predetermined cabin pressure threshold value and through said second oxygen conduit (TOC) when said cabin pressure is above said predetermined cabin pressure threshold value, and a control (16, 26) adapted to activate said supplemental oxygen supply source, whereby said at least one therapeutic oxygen breathing mask is selectively usable both for said emergency oxygen supply purposes through said first oxygen conduit (EOC) and for said therapeutic oxygen supply purposes through said second oxygen conduit (TOC), further comprising an excess pressure control valve (19) operatively connected to said second oxygen conduit (TOC) for releasing excess pressure from said second oxygen conduit (TOC).

19. The oxygen supply system of claim 18, wherein said control is cabin pressure responsive for partially activating said oxygen supply source when said cabin pressure is in said normal range and for fully activating said oxygen supply source when said cabin pressure drops below said predetermined cabin pressure threshold value.

20. A method of supplying oxygen through a plurality of oxygen breathing masks to a plurality of passengers in a passenger cabin of a passenger aircraft, comprising the steps:
  a) making available a supply of oxygen from an oxygen source arrangement;
  b) sensing a cabin pressure of air in said passenger cabin;
  c) in response to activation of a control member indicating that at least one ill passenger among said passengers requires therapeutic oxygen, when said cabin pressure is above a minimum normal cabin pressure threshold level, supplying oxygen from said oxygen source arrangement to said at least one ill passenger through at least one of said oxygen breathing masks allocated to said at least one ill passenger; and
  d) automatically in response to said cabin pressure falling below said minimum normal cabin pressure threshold level, supplying oxygen from said oxygen source arrangement to said plurality of passengers through said plurality of oxygen breathing masks.

21. The method according to claim 20, wherein said at least one of said oxygen breathing masks allocated to said at least one ill passenger is at least one therapeutic oxygen breathing mask.

22. The method according of claim 21, wherein said plurality of oxygen breathing masks further includes plural emergency oxygen breathing masks in addition to said at least one therapeutic oxygen breathing mask, and wherein said oxygen is supplied to said at least one therapeutic oxygen breathing mask and to said plural emergency oxygen breathing masks in said step d).

23. The method according of claim 20, wherein in said step c), said activation of said control member is performed manually by a crew member of said passenger aircraft.

24. In a passenger aircraft including a passenger cabin, an oxygen distribution conduit, plural emergency oxygen masks connected to said conduit and arranged in said passenger cabin, an oxygen supply arrangement, and an automatic emergency oxygen supply regulating arrangement interposed between and adapted to connect said oxygen supply arrangement selectively to said conduit so as to selectively supply emergency oxygen to said conduit and to said plural emergency oxygen masks via said emergency oxygen supply regulating arrangement and said conduit automatically in response to a cabin pressure of air in said passenger cabin falling below a minimum cabin pressure threshold,
- an improvement comprising at least one therapeutic oxygen supply tap connected to said conduit, at least one therapeutic oxygen mask respectively adapted to be connected to said at least one therapeutic oxygen supply tap, and a manually actuatable therapeutic oxygen supply control arrangement interposed between and adapted to connect said oxygen supply arrangement selectively to said conduit so as to selectively supply therapeutic oxygen to said conduit and to said at least one therapeutic oxygen mask via said therapeutic oxygen supply control arrangement and said conduit in response to manual actuation of said therapeutic oxygen supply control arrangement, and
- wherein said improvement is so adapted so that said at least one therapeutic oxygen mask is able to receive said therapeutic oxygen through said therapeutic oxygen supply control arrangement via said conduit in response to the manual actuation of said therapeutic oxygen supply control arrangement, and said at least one therapeutic oxygen mask is able to receive said emergency oxygen through said emergency oxygen supply regulating arrangement via said conduit when the cabin pressure is below the minimum cabin pressure threshold.

25. The improvement in the passenger aircraft according to claim 24, wherein said manually actuatable therapeutic oxygen supply control arrangement comprises a shut-off valve interposed between said oxygen supply arrangement and said conduit, a manually operable control member connected for actuation signal transmission to said shut-off valve, and a pressure limiter interposed in series with said shut-off valve between said oxygen supply arrangement and said conduit.

26. The improvement in the passenger aircraft according to claim 24, wherein said automatic emergency oxygen supply regulating arrangement comprises at least one pressure-responsive valve adapted to be automatically regulated responsive to the cabin pressure.

27. The improvement in the passenger aircraft according to claim 24, wherein said oxygen supply arrangement comprises an emergency oxygen supply that is connected to said automatic emergency oxygen supply regulating arrangement, and a therapeutic oxygen supply that is distinct from said emergency oxygen supply and that is connected to said manually actuatable therapeutic oxygen supply control arrangement.

28. The improvement in the passenger aircraft according to claim 24, further comprising an excess pressure control valve operatively connected to said therapeutic oxygen supply control arrangement and adapted to release excess pressure from said therapeutic oxygen supply control arrangement.

\* \* \* \* \*